United States Patent
Lambert et al.

(10) Patent No.: US 7,605,342 B2
(45) Date of Patent: Oct. 20, 2009

(54) LASER PROCESSING HEAD

(75) Inventors: Martin Lambert, Korb (DE);
Jürgen-Michael Welck, Asperg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 774 days.

(21) Appl. No.: 11/197,540

(22) Filed: Aug. 5, 2005

(65) Prior Publication Data
US 2006/0027537 A1    Feb. 9, 2006

(30) Foreign Application Priority Data
Aug. 6, 2004    (EP) .................................. 04018663

(51) Int. Cl.
*B23K 26/12*    (2006.01)
*B23K 26/14*    (2006.01)

(52) U.S. Cl. ............................ 219/121.67; 219/121.72; 219/121.84

(58) Field of Classification Search ............. 219/121.6, 219/121.61, 121.63, 121.64, 121.74, 121.84, 219/121.85, 121.86, 121.67–121.72
See application file for complete search history.

(56) References Cited

U.S. PATENT DOCUMENTS

| | | | | |
|---|---|---|---|---|
| 3,604,789 A | * | 9/1971 | McLafferty | 359/894 |
| 3,851,273 A | * | 11/1974 | Hoag et al. | 372/104 |
| 3,873,939 A | * | 3/1975 | Guile et al. | 372/104 |
| 3,947,653 A | * | 3/1976 | Fairbairn | 219/76.1 |
| 4,121,085 A | * | 10/1978 | Diemer et al. | 219/121.84 |
| 4,178,078 A | * | 12/1979 | Hausmann | 359/894 |
| 4,207,542 A | * | 6/1980 | Shen | 372/104 |
| 4,402,574 A | * | 9/1983 | McConnel | 359/667 |
| 4,503,329 A | * | 3/1985 | Yamaguchi et al. | 850/1 |
| 4,698,236 A | * | 10/1987 | Kellogg et al. | 427/526 |
| 4,777,426 A | * | 10/1988 | Stephens | 372/104 |
| 5,043,548 A | * | 8/1991 | Whitney et al. | 219/121.47 |
| 5,093,988 A | * | 3/1992 | Becker | 29/860 |
| 5,442,183 A | * | 8/1995 | Matsui et al. | 250/441.11 |
| 5,444,206 A | * | 8/1995 | Isshiki et al. | 219/121.63 |
| 5,786,561 A | * | 7/1998 | Zefferer et al. | 219/121.84 |
| 5,811,753 A | * | 9/1998 | Weick et al. | 219/121.78 |
| 6,316,744 B1 | * | 11/2001 | Nowotny et al. | 219/121.84 |

(Continued)

FOREIGN PATENT DOCUMENTS

DE    4242057    6/1994

(Continued)

OTHER PUBLICATIONS

Office Action from corresponding Chinese Application No. 2005 100910652, mailed Sep. 26, 2008, 5 pages.

(Continued)

*Primary Examiner*—Samuel M Heinrich
(74) *Attorney, Agent, or Firm*—Fish & Richardson P.C.

(57) ABSTRACT

A laser processing head includes a first housing region associated with a beam guidance of a laser processing machine, a second housing region associated with the laser processing head, and an aperture in a wall separating the first and second housing regions. The head is configured such that a laser beam may pass sequentially through the beam guidance, the first housing region, the aperture, and the second housing, and the first housing region includes a first gas atmosphere associated with the beam guidance and maintained at a higher pressure than a second gas atmosphere in the second housing region.

18 Claims, 5 Drawing Sheets

U.S. PATENT DOCUMENTS

| | | | |
|---|---|---|---|
| 6,341,006 B1 * | 1/2002 | Murayama et al. ............ | 355/53 |
| 6,399,916 B1 * | 6/2002 | Gortler et al. .......... | 219/121.84 |
| 6,576,871 B1 * | 6/2003 | Jendick ................. | 219/121.84 |
| 6,624,386 B2 | 9/2003 | Von Borstel | |
| 6,667,459 B1 * | 12/2003 | Woods et al. .......... | 219/121.84 |
| 2005/0109745 A1 * | 5/2005 | Wessner ................ | 219/121.84 |
| 2006/0027537 A1 * | 2/2006 | Lambert et al. .......... | 219/121.6 |

FOREIGN PATENT DOCUMENTS

| | | |
|---|---|---|
| DE | 44 39 790 | 5/1996 |
| DE | 44 39 790 A1 | 5/1996 |
| EP | 0 896 851 | 2/1999 |
| EP | 0 997 222 | 5/2000 |
| EP | 1 180 409 | 2/2002 |
| JP | 402284785 A * | 11/1990 |
| JP | 09168885 A * | 6/1997 |
| JP | 11090670 A * | 4/1999 |
| JP | 02000237890 A * | 9/2000 |

OTHER PUBLICATIONS

Machine English translation of DE 44 39 790 A1, obtained from http://epo.worldlingo.com/wl/epo/epo.html?ACTION=Description&OPS=ops.espacenet.com&SEED=DE4439790&LOCALE=en_EP&SEED_FORMAT=E, printed Mar. 16, 2009, 8 pages.

* cited by examiner

LASER PROCESSING HEAD

CLAIM FOR PRIORITY

This application claims priority under 35 U.S.C. §119 to European Patent Application Serial No. 04018663, filed Aug. 6, 2004, the entire contents of which is hereby incorporated by reference.

TECHNICAL FIELD

The invention relates to a laser processing head and, in particular, to a laser cutting head.

BACKGROUND

In conventional lens cutting optics of laser processing heads, the lens separates the beam guidance from the process gas chamber. The beam guidance of laser cutting machines is flushed with pure gas thereby providing protection from surrounding dirt particles (e.g., smoke from the cutting) and undesired gaseous impurities. The cutting process is mechanically and chemically supported by process gases, generally oxygen or nitrogen. The pressure in the process gas chamber during processing is several bars.

Conventionally, focussing mirrors, which are considerably more robust against soiling compared to transmissive lenses, have been used in $CO_2$ laser welding systems. However, due to the use of such mirrors, the processing side and the beam guiding side are not separate. For this reason, the deflecting optics in the beam guidance can be soiled more quickly due to, for example, smoke produced through welding during the process.

The use of more robust mirror optics is desired for laser welding, which can be, however, difficult to realize due to the very high pressure differences between the atmospheres in the beam guidance chamber and on the processing side.

Hermetic separation between the atmosphere in the beam guidance chamber and on the processing side is conventionally provided by an additional plane window or by disposing a ZnSe window in front of a focussing mirror. This window builds up the pressure for the cutting gas, thereby also separating the beam guidance from the process gas side. In both cases, a transmissive element, sensitive to soiling, is employed. A ZnSe window has known weaknesses due to the temperature-dependent refractive index that can limit its field of application and that of the lens.

It is therefore desirable to develop a laser cutting head that offers a simple constructive separation between the beam guidance and the laser processing region and that can be used for laser powers of more than 10 kW.

SUMMARY

In a first general aspect, a laser processing head includes a first housing region associated with a beam guidance of a laser processing machine, a second housing region associated with the laser processing head, and an aperture in a wall separating the first and second housing regions. The head is configured such that a laser beam may pass sequentially through the beam guidance, the first housing region, the aperture, and the second housing, and the first housing region includes a first gas atmosphere associated with the beam guidance and maintained at a higher pressure than a second gas atmosphere in the second housing region.

Implementations can include one or more of the following features. For example, the head can include a first curved mirror adapted for reflecting the laser beam and a second curved mirror adapted for reflecting the laser beam, where the aperture is disposed substantially at an intermediate focus of the first and second mirrors. The first mirror can be a parabolic mirror and the second mirror can be an ellipsoidal mirror. The head can include a cooling element coupled to the first or second mirror and/or a cooling element coupled to the aperture for cooling the aperture. The cooling element coupled to the aperture can be integrated with the aperture.

The head can further include a pressure sensor responsive to a pressure differential between the first gas atmosphere and the second gas atmosphere. The second housing region can include an annular gap nozzle positioned to accommodate the laser beam and an opening in the second housing region connected to a source of processing gas, with the opening being disposed between the annular gap nozzle and the aperture. The first gas atmosphere can be maintained at a pressure that is at least 1.5 mbar higher than the second gas atmosphere. The aperture can have a transverse dimension that is less than about 2.5 mm.

In another general aspect, a method of laser processing a workpiece includes shining a laser beam from a laser generator through, in order, a first housing region coupled to the beam guidance, a second housing region coupled to a laser processing region, and an aperture in a wall between the first and second housing regions onto the workpiece, while maintaining a first gas atmosphere in the first housing region at a higher pressure than a second gas atmosphere in the second housing region.

Implementations can include one or more of the following features. For example, the laser beam can be reflected with a first curved mirror and with a second curved mirror, where the aperture is disposed substantially at an intermediate focus of the first and second mirrors. The first mirror can be a parabolic mirror and the second mirror can be an ellipsoidal mirror.

The method can further include actively cooling at least one of the first and second mirrors and/or the aperture. The method can further include sensing a pressure differential between the first gas atmosphere and the second gas atmosphere.

The laser beam can further pass through an annular gap nozzle, and the method can further include passing a processing gas through an opening in the second housing region, where the opening is disposed between the annular gap nozzle and the aperture.

The first or second housing region can include the wall between the first and second housing regions. The first gas atmosphere can be maintained at a pressure that is at least 1.5 mbar higher than the second gas atmosphere. A transverse dimension of aperture can be less than about 2.5 mm.

The details of one or more implementations are set forth in the accompanying drawings and the description below. Other features will be apparent from the description and drawings, and from the claims.

DETAILED DESCRIPTION

As disclosed herein, a laser processing head, in particular, a laser cutting or welding head, includes a housing region associated with the beam guidance of a laser processing machine, a housing region associated with a laser processing region, and an aperture through which the laser beam passes and that acts as separating means between the housing regions. The aperture is used to protect and seal the beam guidance from foreign matter such as, for example, cutting gas, the surrounding atmosphere, and dust from cutting. The aperture permits a slight overpressure in the beam guidance compared with the housing region associated with the laser processing region, such that there is small gas loss from the beam guidance chamber and protecting the beam guidance chamber from incoming flows from its surroundings.

The aperture opening can be kept small if a first mirror and a second mirror are provided for deflection and generation of an intermediate focus of the laser beam, with the aperture disposed in the intermediate focus. For generating the intermediate focus, the first mirror can be, for example, a parabolic mirror and the second mirror may be, for example, an ellipsoidal mirror.

The aperture can be heated by incidental laser power and, for this reason, direct or indirect aperture cooling can be used.

The exiting volume flow may be monitored by a pressure sensor mounted to the aperture.

To prevent gas flows from escaping the laser processing region and entering the beam guidance due to a corresponding overpressure in the space between aperture and cutting nozzle, a relief opening is located between an annular gap nozzle and the aperture. Thus, particulates from the processing, for example, from piercing splashes, cannot contaminate the beam guidance. For example, if oxygen is used as cutting gas, high concentrations of the oxygen are prevented from entering into the beam guiding atmosphere.

Figure 1:
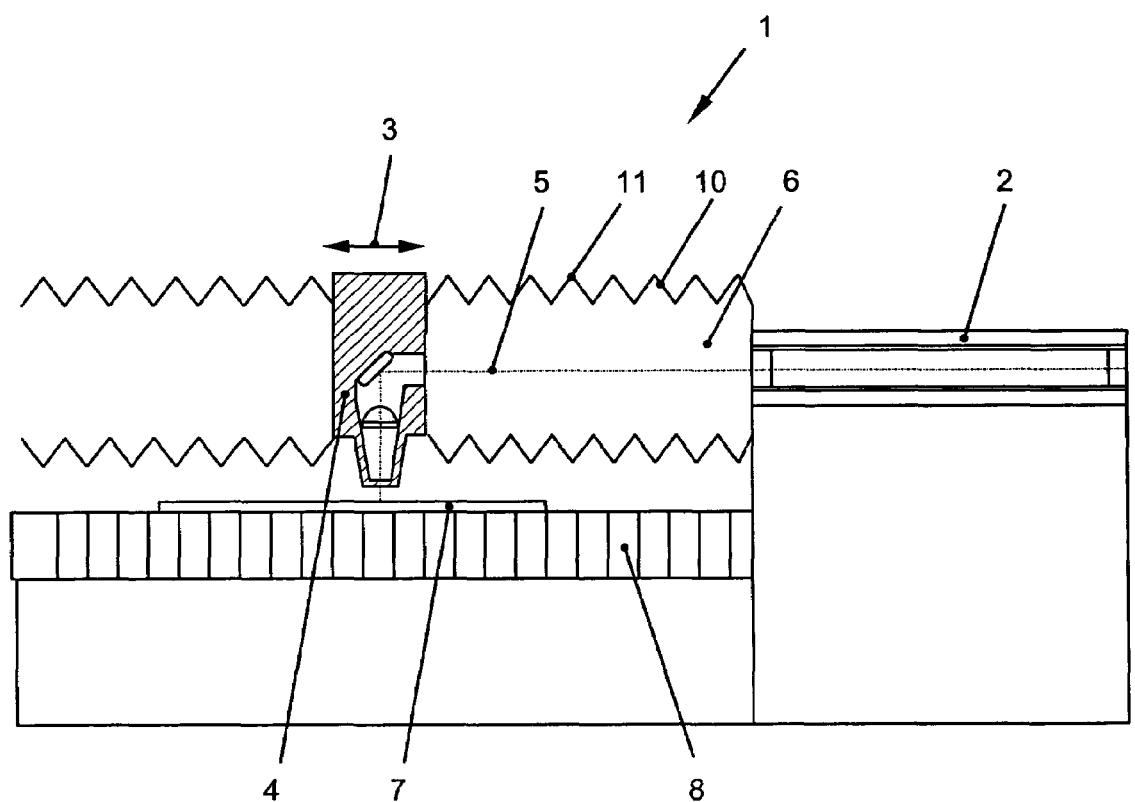
FIG. 1 is a side view of a laser processing machine.

As shown in FIG. 1, a laser processing machine 1 includes a laser generator 2 and a laser processing head 4. The laser processing head 4 can be moved in the direction of a double arrow 3. A laser beam 5 generated by the laser generator 2 and is guided from laser generator 2 through a beam guidance chamber 6, where it is flushed with pure gas. The laser beam 5 is then guided to the processing head 4, where it is directed to a workpiece 7, for example, a sheet of sheet metal, that is disposed on a workpiece support 8 of the laser processing machine 1.

The beam guidance chamber 6 is filled with pure gas, e.g., nitrogen. The beam guidance chamber 6 is limited, for example, by a bellows 10 or by another hermetical seal, for example, a tube, telescopic tube, or the like. The bellows 10 forms the gas chamber wall and consists of flexible folds 11 that are positioned next to each other.

Figure 2:
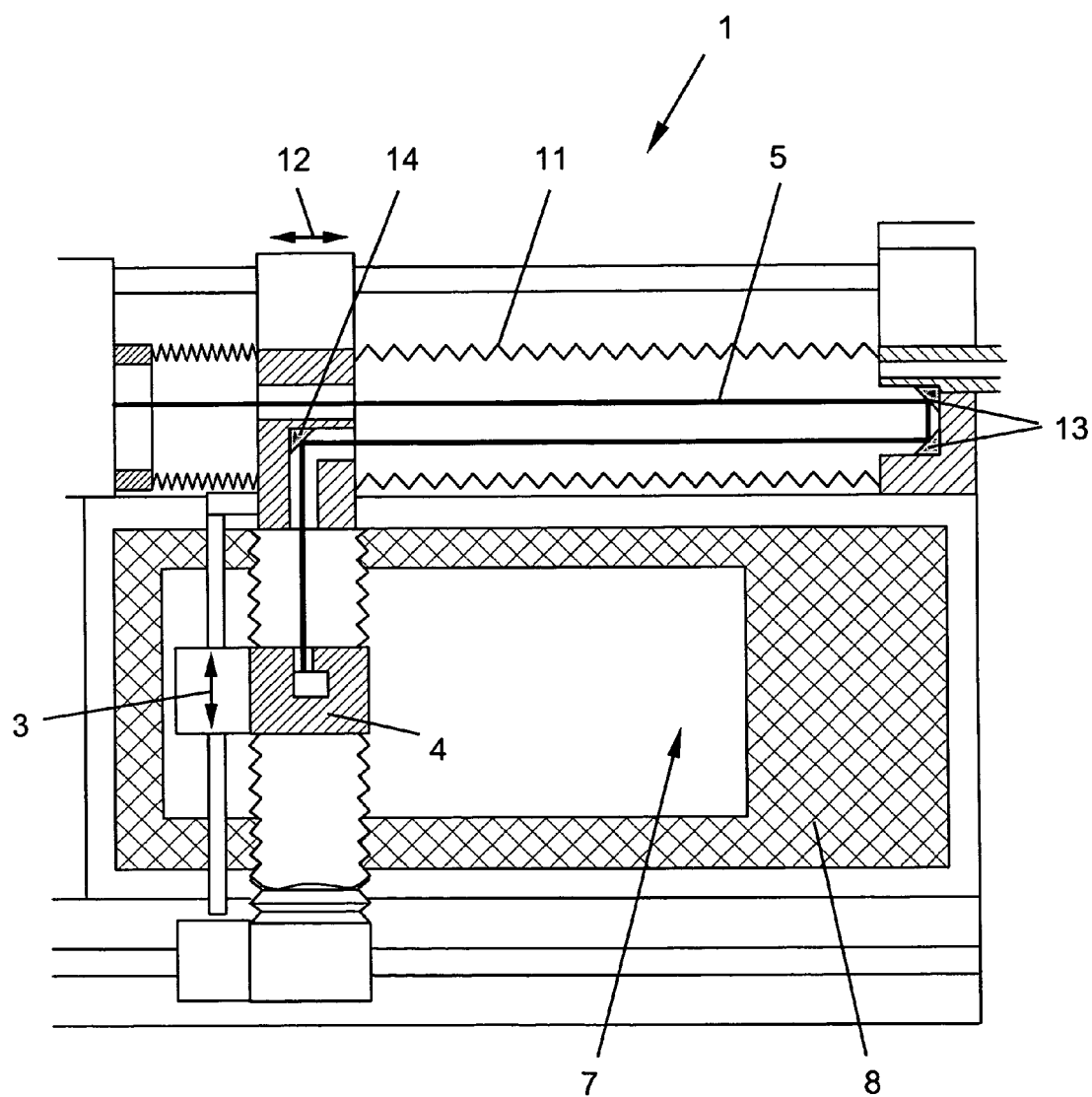
FIG. 2 is a top view of the laser processing machine.

As shown in FIG. 2, the laser processing head 4 has two axes so that it can be positioned in the direction of double arrow 3 and perpendicular to the direction of double arrow 12. The laser beam 5 is guided from the laser generator, via a first beam deflecting means 13 (e.g., a mirror) and a second beam deflecting means 14, to processing head 4, where the laser beam 5 is deflected toward the workpiece 7.

Figure 3:
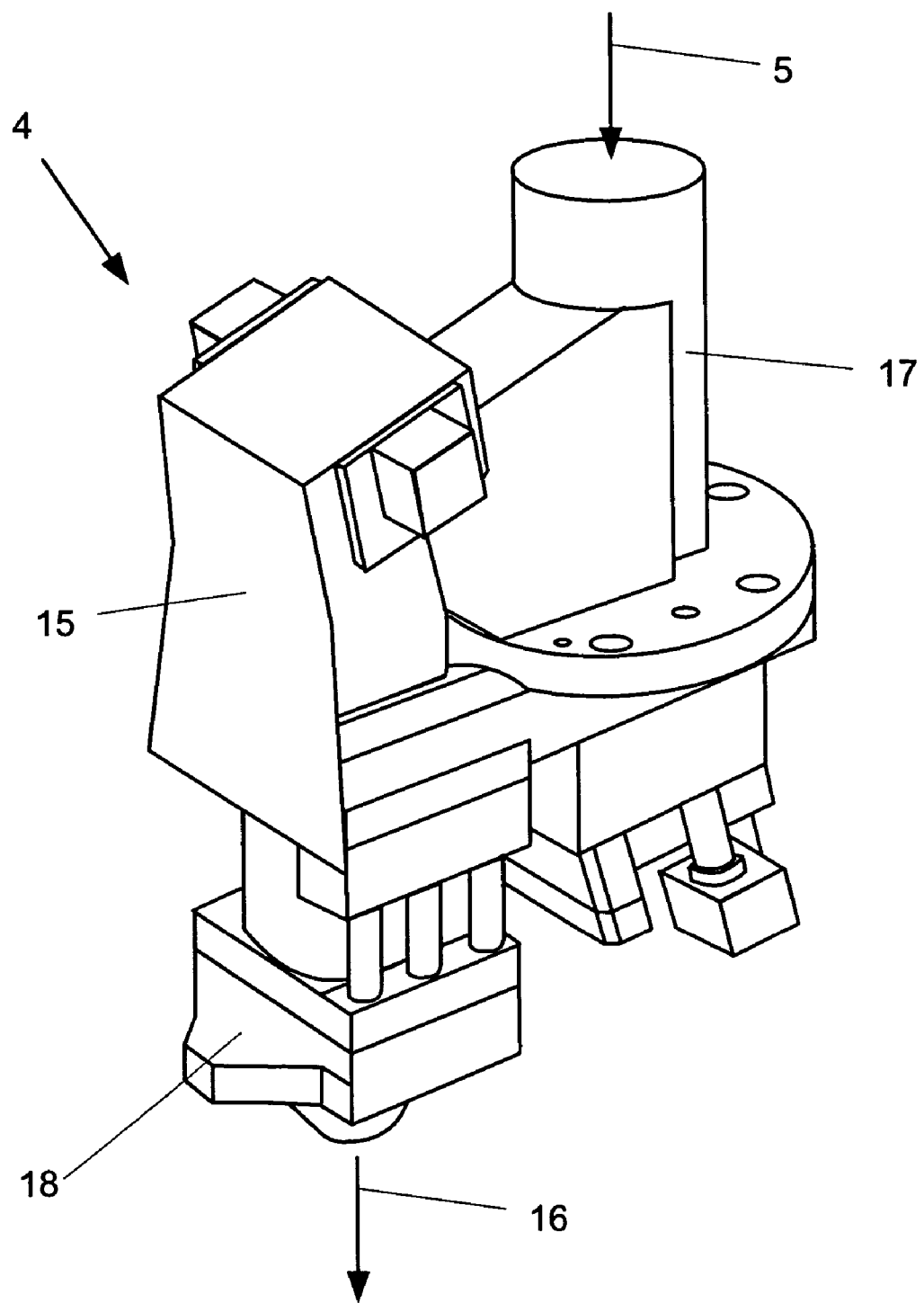
FIG. 3 is an isometric illustration of a laser processing head.

FIG. 3 shows a housing 15 of laser processing head 4. The housing 15 can be coupled to the laser processing machine 1. The laser beam 5 can be deflected and focussed within the housing 15 so that a focussed laser beam 16 is directed to the workpiece 7. A housing region 17 associated with the beam guidance can be separated from a housing region 18 that is associated with the laser processing region through mirror focussing and by an aperture in the housing 15. The beam guidance is flushed with pure gas that is slightly overpressurized in the beam guidance chamber compared to outside the beam guidance chamber. The housing region 17 can be filled with the gas, while the housing region 18 is no longer flushed with gas.

Figure 4:
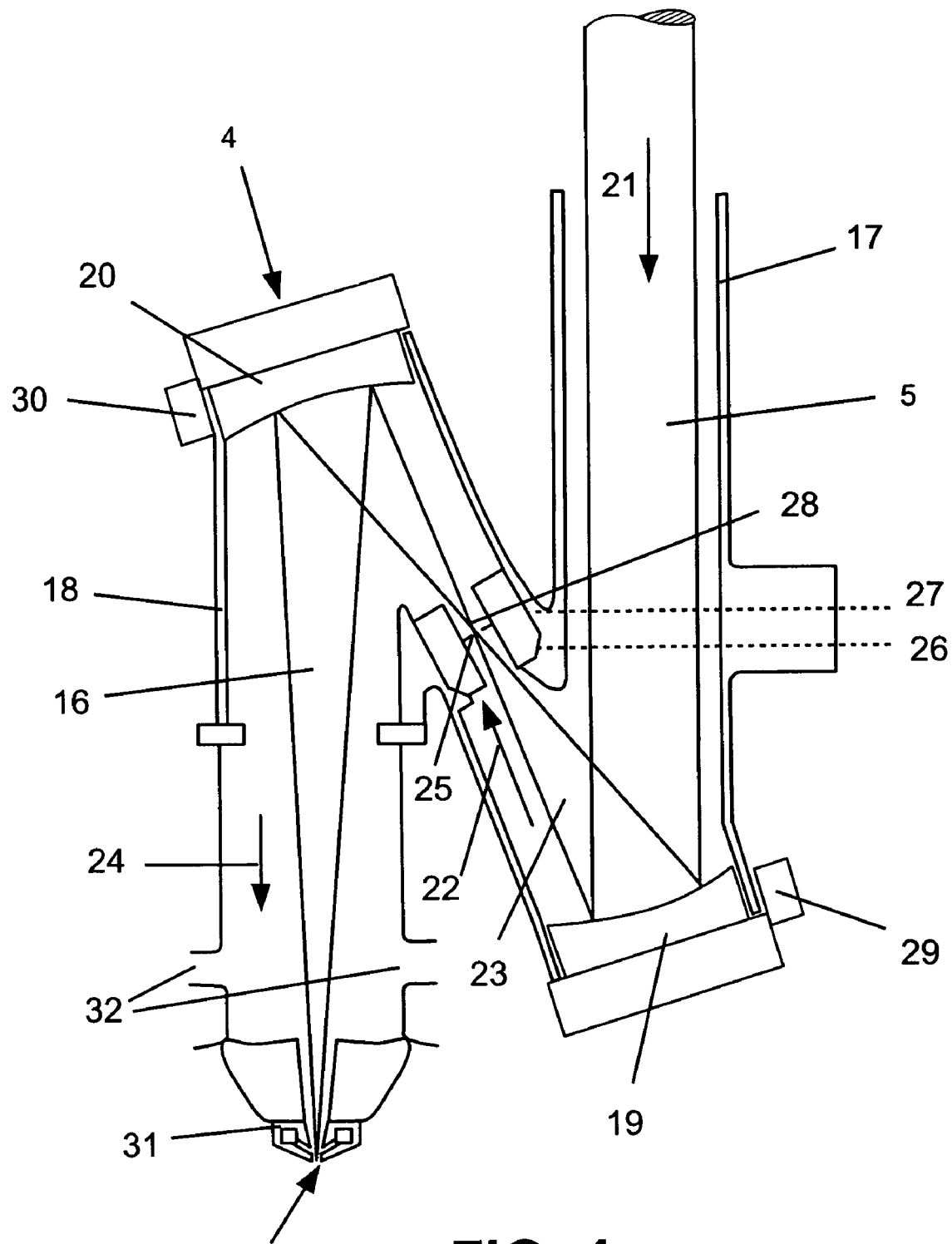
FIG. 4 illustrates a longitudinal section of the laser processing head.

As shown in FIG. 4, to separate the process gas side from the beam guidance atmosphere, laser beam 5 may be guided through an intermediate focus. The components of laser processing head 4 used for this purpose are formed by, for example, a focussing parabolic mirror 19 and an ellipsoidal mirror 20. The laser beam emitted from the beam guidance in direction 21 may be deflected by the parabolic mirror 19 in a direction 22 and may then be focussed. An ellipsoidal mirror 20 images the laser beam 23 on the working focus in a direction 24 to produce a focussed laser beam 16 that may be used for laser processing.

Aperture 25 can be positioned at an intermediate focus 28 between the two optics 19 and 20, and laser beam 23 passes through the aperture 25. The diameter of aperture 25 can be sized so that laser beam 23 does not touch the edge of aperture 25 resulting in a relatively small loss of the scavenging gas in the beam guidance. To monitor leakage (e.g., through evaluation of the pressure difference) the aperture 25 can be provided with a pressure sensor (not shown, but which can be provided at housing position 26). A coolant connection (not shown, but which can be provided at housing position 27) is provided for cooling the aperture 25.

The mirror 20 images the laser beam 23 coming from the focus 28 to generate the focussed laser beam 16. Both mirrors 19 and 20 may be cooled with coolant connections 29 and 30, respectively. There may be a slight overpressure within the housing region 17 compared to the pressure in the housing region 18, due to the flushing gas in the beam guidance. For laser cutting using the laser processing head 4, the cutting gas at the working focus is pressurized using an annular gap nozzle 31. Since nozzles of this construction may also include a reverse flow, discharge may be possible through sufficiently large openings 32 between aperture 25 and annular gap nozzle 31. The openings 32 are dimensioned to prevent the static pressure generated in the housing 15 from being larger than that within the beam guidance. Without such dimensioning, the direction of the leakage flow into the beam guidance would be reversed, and gas would flow into the beam guidance rather than out of it.

Figure 5:
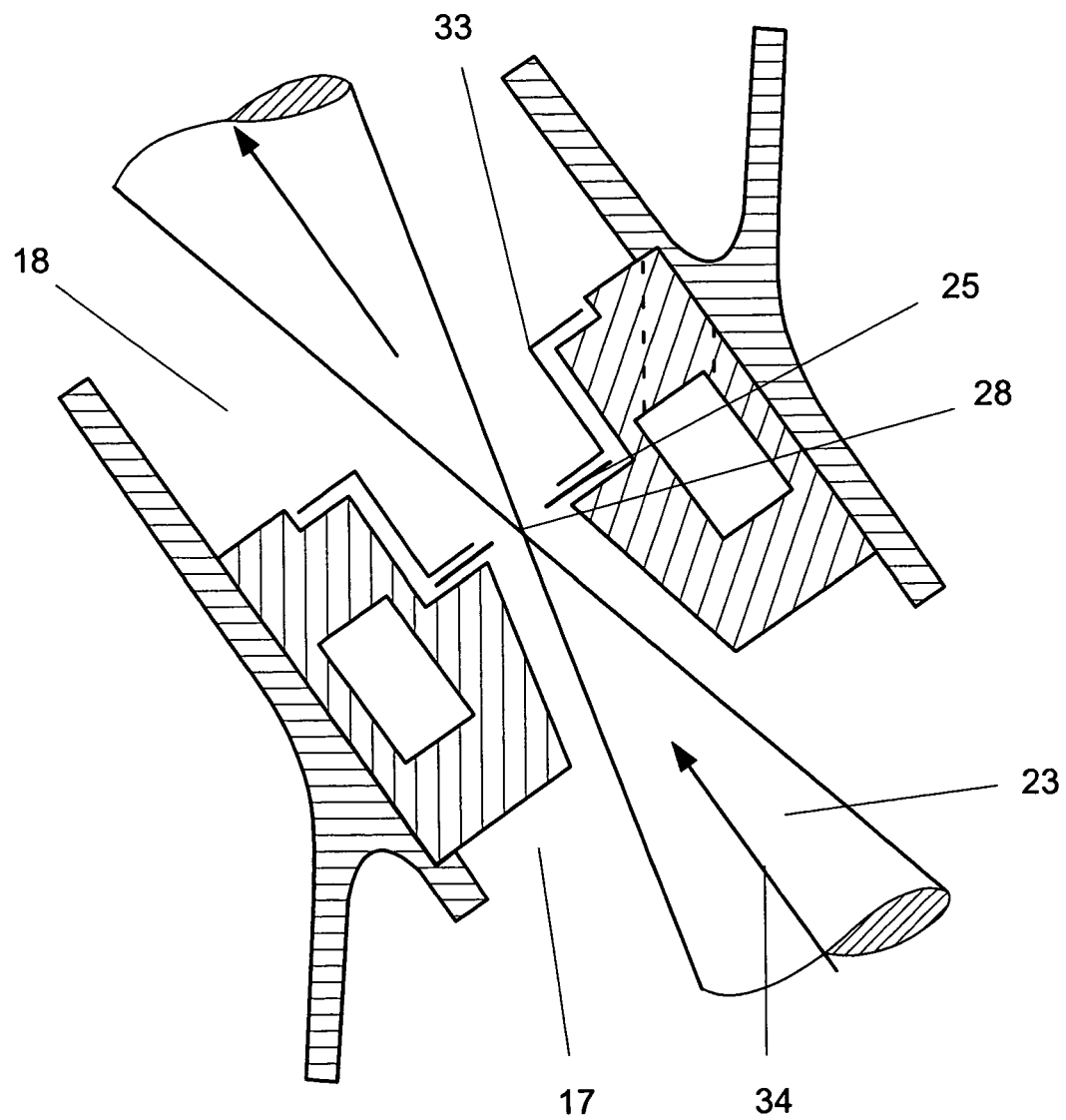
FIG. 5 illustrates a longitudinal section of a aperture of the laser processing head.

As shown in FIG. 5, the laser beam may be deflected and focussed (focus 28) by the first mirror. Cooling body 33 absorbs the heat of laser beam 23. Cooling body 33 may be inserted within aperture 25, which is rotationally symmetrical relative to the direction of passage of the laser beam. For illustrative purposes, in the case of an overpressure of 1.5 mbar in the beam guidance, volume flow 34 through aperture 25 is 3.5 l/min with an aperture opening of 2.5 mm.

A number of implementations have been described. Nevertheless, it will be understood that various modifications may be made. Accordingly, other implementations are within the scope of the following claims.

What is claimed is:

1. A laser processing head comprising:
   a first housing region associated with a beam guidance of a laser processing machine;
   a second housing region associated with the laser processing head; and
   an aperture in a wall separating the first and second housing regions, wherein the head is configured such that a laser beam may pass sequentially through the beam guidance, the first housing region, the aperture, and the second housing, wherein the second housing region comprises an annular gap nozzle positioned to accommodate the laser beam, the annular gap nozzle being used for pressuring a cutting gas, and at least one opening in the second housing for discharging a reverse flow of the cutting gas, the opening being disposed between the annular gap nozzle and the aperture, and wherein the first housing region includes a first gas atmosphere associated with the beam guidance and maintained at a higher pressure than a second gas atmosphere in the second housing region.

2. The laser processing head of claim 1, further comprising:
a first curved mirror adapted for reflecting the laser beam; and a second curved mirror adapted for reflecting the laser beam, wherein
the aperture is disposed substantially at an intermediate focus of the first and second mirrors.

3. The laser processing head of claim 2, wherein the first mirror is a parabolic mirror and wherein the second mirror is an ellipsoidal mirror.

4. The laser processing head of claim 2, further comprising a cooling element coupled to the first or second mirror.

5. The laser processing head of claim 1, further comprising a cooling element coupled to the aperture for cooling the aperture.

6. The laser processing head of claim 5, wherein the cooling element is integrated with the aperture.

7. The laser processing head of claim 1, further comprising a pressure sensor responsive to a pressure differential between the first gas atmosphere and the second gas atmosphere.

8. The laser processing head of claim 1, wherein the first gas atmosphere is maintained at a pressure that is at least 1.5 mbar higher than the second gas atmosphere.

9. The laser processing head of claim 1, wherein the aperture has a transverse dimension that is less than about 2.5 mm.

10. A method of laser processing a workpiece, the method comprising:
shining a laser beam from a laser generator through, in order, a first housing region coupled to the beam guidance, a second housing region coupled to a laser processing region, and an aperture in a wall between the first and second housing regions onto the workpiece;
passing the laser beam through an annular gap nozzle which is used for pressurizing a cutting gas;
discharging a reverse flow of the cutting gas through an opening in the second housing region, wherein the opening is disposed between the annular gap nozzle and the aperture; and
maintaining a first gas atmosphere in the first housing region at a higher pressure than a second gas atmosphere in the second housing region.

11. The method of claim 10, further comprising:
reflecting the laser beam with a first curved mirror; and
reflecting the laser beam with a second curved mirror, wherein
the aperture is disposed substantially at an intermediate focus of the first and second mirrors.

12. The method of claim 11, wherein the first mirror is a parabolic mirror and wherein the second mirror is an ellipsoidal mirror.

13. The method of claim 11, further comprising actively cooling at least one of the first and second mirrors.

14. The method of claim 10, further comprising actively cooling the aperture.

15. The method of claim 10, further comprising sensing a pressure differential between the first gas atmosphere and the second gas atmosphere.

16. The method of claim 10, wherein the first or second housing region comprises the wall between the first and second housing regions.

17. The method of claim 10, wherein the first gas atmosphere is maintained at a pressure that is at least 1.5 mbar higher than the second gas atmosphere.

18. The method of claim 10, wherein a transverse dimension of aperture is less than about 2.5 mm.

* * * * *

UNITED STATES PATENT AND TRADEMARK OFFICE
CERTIFICATE OF CORRECTION

PATENT NO. : 7,605,342 B2
APPLICATION NO. : 11/197540
DATED : October 20, 2009
INVENTOR(S) : Martin Lambert and Jürgen-Michael Weick It is certified that error appears in the above-identified patent and that said Letters Patent is hereby corrected as shown below:

On the Title page, Item (75) Inventors, please delete "Jürgen-Michael Welck" and insert
--Jürgen-Michael Weick--

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,605,342 B2
APPLICATION NO. : 11/197540
DATED : October 20, 2009
INVENTOR(S) : Lambert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

Signed and Sealed this

Fifth Day of October, 2010

David J. Kappos
*Director of the United States Patent and Trademark Office*